US009936439B2

(12) United States Patent
Li et al.

(10) Patent No.: US 9,936,439 B2
(45) Date of Patent: *Apr. 3, 2018

(54) SENSOR NETWORK INFORMATION COLLECTION VIA MOBILE GATEWAY

(71) Applicant: Avago Technologies General IP (Singapore) Pte. Ltd., Singapore (SG)

(72) Inventors: Zhenhong Li, Shanghai (CN); Haifeng Wang, Shanghai (CN); Jun Xia, Shanghai (CN); Yi Miao, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,572

(22) Filed: Feb. 27, 2016

(65) Prior Publication Data

US 2016/0212684 A1 Jul. 21, 2016

Related U.S. Application Data

(60) Division of application No. 14/459,165, filed on Aug. 13, 2014, now Pat. No. 9,313,828, which is a division (Continued)

(51) Int. Cl.
*H04L 12/28* (2006.01)
*H04W 40/32* (2009.01)
(Continued)

(52) U.S. Cl.
CPC ............ *H04W 40/32* (2013.01); *H04L 45/22* (2013.01); *H04L 45/745* (2013.01); *H04L 67/12* (2013.01);
(Continued)

(58) Field of Classification Search
None
See application file for complete search history.

(56) References Cited

U.S. PATENT DOCUMENTS 7,002,470 B1   2/2006   Miao
7,035,240 B1   4/2006   Balakrishnan et al.
(Continued)

FOREIGN PATENT DOCUMENTS

CN   101039321   9/2007
CN   101132351   2/2008
CN   101488975   7/2009

OTHER PUBLICATIONS

International Search Report and Written Opinion for International Application No. PCT/CN2011/072743, dated Aug. 25, 2011, 8 pages.

(Continued)

*Primary Examiner* — Anh-Vu Ly
(74) *Attorney, Agent, or Firm* — Foley & Lardner LLP

(57) ABSTRACT

There is provided a sensor network information collection mechanism in which, after a UE has decided to become part of an information collecting operation for collecting information from a local sensor network, a signaling transmitted from a managing node of a local sensor network is received and processed. A communication network control element is informed about the willingness to become an information collector by sending a report message comprising measurement results derived from the signaling received from the managing node of the local sensor network. When receiving a gateway allocation message indicating that the UE is determined to be a gateway element to the local sensor network, the information collecting operation is started wherein sensor nodes of the local sensor network are woke up, and a traffic flow direction in the local sensor network is
(Continued)

set in accordance with the managing node identity to which the UE is accessed.

19 Claims, 6 Drawing Sheets

Related U.S. Application Data of application No. 13/559,208, filed on Jul. 26, 2012, now abandoned, which is a division of application No. 12/298,954, filed on Nov. 17, 2011, now Pat. No. 8,279,810, which is a continuation of application No. PCT/CN2011/072743, filed on Apr. 13, 2011.

(51) Int. Cl.
*H04W 4/00* (2018.01)
*H04W 40/00* (2009.01)
*H04L 29/08* (2006.01)
*H04L 12/707* (2013.01)
*H04W 92/02* (2009.01)
*H04L 12/741* (2013.01)
*H04W 28/12* (2009.01)
*H04W 40/24* (2009.01)
*H04W 24/10* (2009.01)
*H04W 84/18* (2009.01)
*H04W 84/20* (2009.01)
*H04W 88/02* (2009.01)
*H04W 88/08* (2009.01)
*H04W 88/16* (2009.01)

(52) U.S. Cl.
CPC ........... *H04W 4/006* (2013.01); *H04W 28/12* (2013.01); *H04W 40/005* (2013.01); *H04W 40/244* (2013.01); *H04W 92/02* (2013.01); H04W 24/10 (2013.01); H04W 84/18 (2013.01); H04W 84/20 (2013.01); H04W 88/02 (2013.01); H04W 88/08 (2013.01); H04W 88/16 (2013.01)

(56) References Cited

U.S. PATENT DOCUMENTS

| | | | |
|---|---|---|---|
| 8,134,950 B2 | 3/2012 | Pun | |
| 8,279,810 B1 | 10/2012 | Li et al. | |
| 9,313,828 B2* | 4/2016 | Li | H04W 4/006 |
| | | | 370/338 |
| 2002/0169846 A1 | 11/2002 | Chen et al. | |
| 2003/0041150 A1 | 2/2003 | Passman et al. | |
| 2003/0151513 A1 | 8/2003 | Herrmann et al. | |
| 2004/0157557 A1 | 8/2004 | Barnett et al. | |
| 2006/0271661 A1 | 11/2006 | Qi et al. | |
| 2007/0038346 A1 | 2/2007 | Ehrlich et al. | |
| 2007/0195808 A1 | 8/2007 | Ehrlich et al. | |
| 2007/0233835 A1 | 10/2007 | Kushalnagar et al. | |
| 2007/0287498 A1 | 12/2007 | Wang et al. | |
| 2007/0299950 A1 | 12/2007 | Kulkarni | |
| 2008/0018438 A1 | 1/2008 | Ehrlich et al. | |
| 2008/0191893 A1 | 8/2008 | Li et al. | |
| 2008/0253327 A1* | 10/2008 | Kohvakka | H04W 16/14 |
| | | | 370/330 |
| 2009/0005016 A1 | 1/2009 | Eng et al. | |
| 2009/0029650 A1* | 1/2009 | Shon | H04L 1/188 |
| | | | 455/68 |
| 2009/0154395 A1 | 6/2009 | Park et al. | |
| 2009/0154407 A1 | 6/2009 | Jeong et al. | |
| 2009/0190541 A1 | 7/2009 | Abedi | |
| 2009/0207769 A1 | 8/2009 | Park et al. | |
| 2009/0322510 A1 | 12/2009 | Berger et al. | |
| 2010/0039940 A1 | 2/2010 | Wang et al. | |
| 2010/0074133 A1* | 3/2010 | Kim | G01S 5/0289 |
| | | | 370/252 |
| 2010/0091715 A1 | 4/2010 | Akchurin et al. | |
| 2010/0148940 A1 | 6/2010 | Gelvin et al. | |
| 2010/0182901 A1 | 7/2010 | Yoon | |
| 2010/0202335 A1 | 8/2010 | Borean et al. | |
| 2010/0268825 A1 | 10/2010 | Jeong et al. | |
| 2010/0310011 A1 | 12/2010 | Sexton et al. | |
| 2011/0038343 A1* | 2/2011 | Bhatti | H04W 28/06 |
| | | | 370/330 |
| 2011/0055424 A1 | 3/2011 | Jiang et al. | |
| 2011/0188378 A1 | 8/2011 | Collins et al. | |
| 2011/0280154 A1 | 11/2011 | Silverstrim et al. | |
| 2012/0002564 A1 | 1/2012 | Sexton et al. | |
| 2012/0002627 A1 | 1/2012 | Norlen et al. | |
| 2012/0026941 A1* | 2/2012 | Ahmad | H04W 48/16 |
| | | | 370/328 |
| 2012/0102409 A1 | 4/2012 | Fan et al. | |
| 2012/0105255 A1 | 5/2012 | Rennie et al. | |
| 2012/0319866 A1 | 12/2012 | Svoen et al. | |

OTHER PUBLICATIONS

Non-Final Office Action for U.S. Appl. No. 14/459,165 dated May 27, 2015.

Final Office Action for U.S. Appl. No. 14/459,165 dated Aug. 20, 2015.

Notice of Allowance for U.S. Appl. No. 14/459,165 dated Aug. 20, 2015.

* cited by examiner

SENSOR NETWORK INFORMATION COLLECTION VIA MOBILE GATEWAY

CROSS-REFERENCE TO RELATED APPLICATIONS

This is a divisional of and claims priority to and the benefit of U.S. patent application Ser. No. 14/459,165, filed Aug. 13, 2014, which is a divisional of and claims priority to and the benefit of U.S. patent application Ser. No. 13/559,208, filed Jul. 26, 2012, which is a divisional of and claims priority to and the benefit of U.S. patent application Ser. No. 13/298,954, filed Nov. 17, 2011, which is a continuation of and claims priority to and the benefit of PCT International Application No. PCT/CN2011/072743, filed Apr. 13, 2011, the entire disclosure of each of which is incorporated herein by reference for all purposes.

BACKGROUND

The present disclosure relates to a mechanism usable for collecting information from a local sensor network, such as a wireless sensor network, by means of a communication network element, such as a user equipment, functioning as a gateway to the local sensor network. In particular, the present disclosure is related to a mechanism for accessing a local sensor network via a gateway in order to be able to collect information from the local sensor network at a sink node.

The following meanings for the abbreviations used in this specification apply:
BC: Beacon Cluster
CH: Cluster Head
eNB: evolved Node B
ID: Identification
LTE: Long Term Evolution
LTE-A: LTE Advanced
SN: Sensor Node
UE: User Equipment
WSN: Wireless Sensor Network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Information sharing between different types of network entities drives the aggregation of heterogeneous networks. This kind of aggregation provides for example the possibility to exchange information between entities of a local network and a heterogeneous network.

A specific example for a combination of capabilities of different networks for information sharing is to use a cellular network element such as a user equipment or entity (UE) as a gateway for a local sensor network, such as a wireless sensor network. That is, elements of a cellular network and a wireless sensor network are mixed so as to easily expand the function of each network.

A WSN as an example for a local sensor network may consist of spatially distributed autonomous sensors which are configured to monitor different parameters, such as physical or environmental conditions like temperature, sound, pressure, movements, concentrations of specific elements in the air etc. The sensor nodes are further configured to cooperatively pass data through a network to a main location which is also referred to as sink. Also bi-directional communication between the sensor nodes and the sink is possible to as to enable a control of the sensors, for example. WSNs are used, for example, in many industrial and consumer applications, such as industrial process monitoring and control, machine health monitoring, environment and habitat monitoring, healthcare applications, traffic control and the like. The nodes of the WSN may comprise sensor nodes (SN) and one or more cluster head (CH) nodes. Cluster head nodes are used as managing nodes when a WSN is divided in one or more clusters containing plural sensor nodes and one cluster head node. The sensor nodes are connected to one (or sometimes several) other sensor nodes, wherein their data are forwarded to a respective cluster head which transmit the aggregated information to the sink. A sensor node has typically several parts: a transceiver with an antenna or connection to an antenna, a microcontroller, an electronic circuit for interfacing with the sensors and an energy source, e.g. a battery or an embedded form of energy harvesting. The topology of a WSN can vary from a simple star shape to a multi-hop mesh network.

Usually, in a WSN, the sink is local device for collecting data of whole network, wherein each network deploys a local sink. It is possible that a sink can communicate with other sinks via the Internet, if necessary, for example in order to obtain information of other sensors not being associated to the network of this sink. That is, conventional WSN may be connected via the Internet in order to achieve the goal to share information.

However, data collection efficiency in this case is rather low in terms of the fixed sink. This could be overcome, for example, by increasing the number of sinks, but this would actually lead to a further division of the local network into several parts, which may increase costs and complicates the managing of the sensor networks as a whole.

There have been proposed several attempts to improve the linking between cellular networks and WSNs. One reason for this is that there is a contradiction between the usual function of a communication network element of the cellular network and a function of a sink node in WSN. For example it has been tried to optimize the selection of cluster heads to meet specific constraints, but there are still open questions how to overcome problems with regard to computation and communication overheads incurred by re-clustering.

There has been also proposed a so-called Complete Graph-based Clustering Algorithm (CGCA) which is applicable in a densely deployed sensor network. According to this approach, the network is divided into a few complete graphs, each complete graph independently being a cluster.

SUMMARY

An embodiment relates to an apparatus, method and computer program product by means where information from a local sensor network, such as a WSN, can be collected more efficiently by using a communication network element, such as a UE, as a gateway between the local sensor network and a communication network control element functioning as a sink of the local sensor network.

According to an example of the proposed solution, there is provided, for example, an apparatus comprising a processor configured to decide on whether an information collecting operation for collecting information from a local sensor network is executed, a first receiver configured to receive a signaling transmitted from a managing node of a local sensor network, and a transmitter configured to transmit to a communication network control element a report message comprising measurement results derived from the signaling received from the managing node of the local sensor network.

Furthermore, according to an example of the proposed solution, there is provided, for example, a method comprising deciding whether an information collecting operation for collecting information from a local sensor network is executed, receiving a signaling transmitted from a managing node of a local sensor network, and transmitting to a communication network control element a report message comprising measurement results derived from the signaling received from the managing node of the local sensor network.

Moreover, according to a further example of the proposed solution, there is provided, for example, an apparatus comprising a receiver configured to receive from a communication network element an accessing request for requesting allocation as a gateway element for collecting information from a local sensor network, the accessing request comprising a report of measurement results regarding a signaling received by the communication network element from a managing node of the local sensor network, a processor configured to determine whether the communication network element is to be selected as a gateway element, and a transmitter configured to send, in response to the accessing request, a gateway allocation message informing that the communication network element is determined to be a gateway element to the local sensor network.

Furthermore, according to the further example of the proposed solution, there is provided, for example, a method comprising receiving from a communication network element an accessing request for requesting allocation as a gateway element for collecting information from a local sensor network, the accessing request comprising a report of measurement results regarding a signaling received by the communication network element from a managing node of the local sensor network, determining whether the communication network element is to be selected as a gateway element, and sending, in response to the accessing request, a gateway allocation message informing that the communication network element is determined to be a gateway element to the local sensor network.

In addition, according to another example of the proposed solution, there is provided, for example, an apparatus, comprising a routing processing portion configured to adjust a traffic flow direction in accordance with network topology information transmitted from a communication network element, wherein the network topology information indicates a cluster head node identification identifying at least one network node acting as a cluster head node for a local sensor network, wherein the routing processing portion is further configured to determine a next destination node for a data traffic flow in the local sensor network on the basis of the cluster head node identification.

Furthermore, according to the another example of the proposed solution, there is provided, for example, a method, comprising adjusting a traffic flow direction in accordance with network topology information transmitted from a communication network element, wherein the network topology information indicates a cluster head node identification identifying at least one network node acting as a cluster head node for a local sensor network, wherein determine a next destination node for a data traffic flow in the local sensor network is determined on the basis of the cluster head node identification.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to improve the efficiency of a collection of WSN information by using beacon cluster for accessing the WSN since a communication network node such as a UE can be used as a semi-static gateway while a communication network control network such as a base station or eNB can be act as the sink for the sensor network. Furthermore, it is possible to reduce a re-clustering communication overhead since a change of routes between the sensor nodes is minimized. Thus, energy can be saved and the sensor network lifetime can be prolonged.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a cellular communication system which may be based on a 3GPP LTE system, and a local sensor network being configured as a WSN. However, it is to be noted that the present invention is not limited to an application using such a communication system or local sensor network architecture, but is also applicable in other types of communication systems, connection link, local networks and the like.

A basic system architecture of a cellular communication network may comprise a commonly known architecture comprising a wired or wireless access network subsystem and a core network. Such an architecture comprises one or more access network control elements, radio access network elements, access service network gateways or base transceiver stations, such as eNBs, with which a communication network element or device such as a UE is capable to communicate via one or more channels for transmitting several types of data. Furthermore, core network elements such as gateway network elements, policy and charging control network elements, mobility management entities and the like are usually comprised. The general functions and interconnections of those elements, depending on the actual network type, are known to those skilled in the art and described in corresponding specifications so that a detailed description thereof is omitted herein. However, it is to be noted that several additional network elements and signaling links may be employed for a communication connection to or from UEs, besides those described in detail herein below.

Furthermore, the described network elements, such as network nodes like UEs, eNBs (access network control elements or base stations), or the like, as well as corresponding functions as described herein may be implemented by software, e.g. by a computer program product for a computer, and/or by hardware. In any case, for executing their respective functions, correspondingly used devices and network elements may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
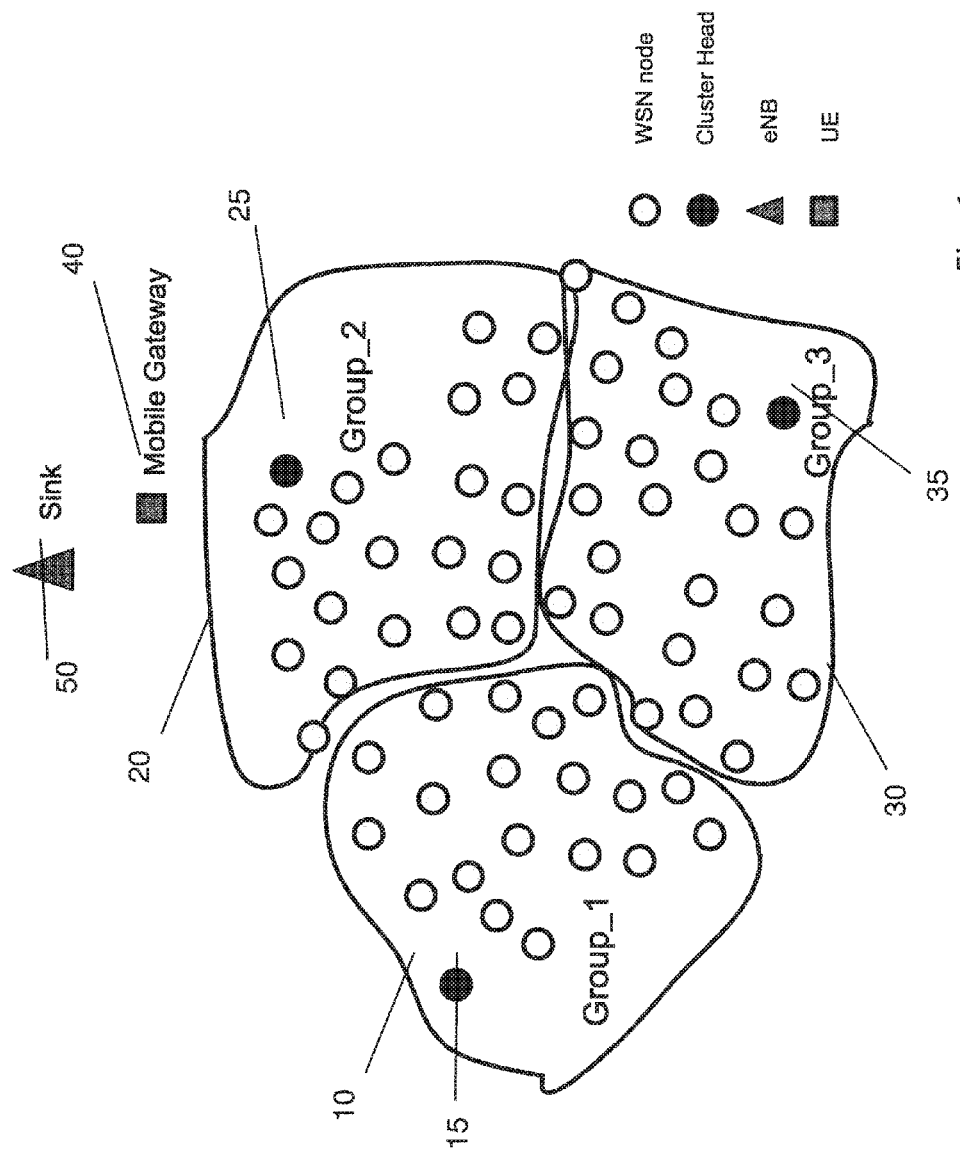
FIG. 1 shows a diagram illustrating a general configuration of a wireless sensor network comprising a beacon cluster structure.

In FIG. 1, diagram illustrating a general configuration of a (wireless) local sensor network comprising a beacon cluster structure is shown. It is to be noted that the structure indicated in FIG. 1 shows only those network elements or parts which are useful for understanding the principles underlying examples of embodiments of the invention. As known by those skilled in the art there may be several other network elements or devices involved in a connection between the local sensor network elements, the local sensor network and the gateway, as well as the gateway and the sink which are however omitted here for the sake of simplicity.

As can be seen in FIG. 1, the sensor network is divided into three groups Group_1 10, Group_2 20 and Group_3 30. Each of these groups 10, 20, 30 is also referred to as cluster and contains a plurality of sensor nodes or WSN nodes (indicated by white filled circles) and one managing node or cluster head node 15, 25 and 35 (indicated by black filled circles), respectively. Furthermore, FIG. 1 shows a gateway or mobile gateway element 40 and a sink element 50, which will be further discussed below.

In the local sensor network configuration according to FIG. 1, in order to minimize the power consumption and to prolong the WSN lifetime, most of the nodes, in particular the sensor nodes, may be in an idle mode as long as they are not needed. Only the cluster heads 15, 25, 35 may be used regularly for sending a signal, such as a beacon signal, for the purpose of providing WSN information on needed basis. By means of this, as all the WSN nodes are in idle mode except only the cluster heads which sends regularly a beacon signal, power consumption can be minimized and the network lifetime can be prolonged.

According to examples of embodiments of the invention, it is assumed that a communication network control element of a cellular communication network, such as an eNB, is used as the unique sink of a local sensor network. Furthermore, a communication network element of the cellular communication network, such as a cellular UE, is intended to be used as a gateway element for accessing the sensor network and for establishing a communication connection between the local sensor network and the eNB, for example. For this purpose, the communication network element, e.g. the UE, may be equipped with corresponding means allowing an access to the local sensor network, for example a wireless sensor network module. Thus, the communication network element (e.g. the UE) is used to collect sensor information (e.g. measured data of the sensor nodes or the like) and then to transmit them to the eNB acting as the sink.

In such a configuration, the communication network element is used as a quasi-static gateway of the WSN. Since a direct communication between the eNB acting as the sink of the local sensor network and the sensor nodes for transmitting the sensor data may not be possible, e.g. because of the distance between the WSN and the eNB, changing communication properties etc., the communication network device in the form of e.g. the UE acts as an information collector and as a relay so that the transmission link efficiency can be improved. Furthermore, examples of embodiments of the invention provide a suitable mechanism to set the topology of local sensor network, i.e. an internal routing of information flow between the sensor nodes, in accordance with the location of the mobile gateway (e.g. the UE) in relation to the sensor network, as described below.

In other words, according to examples of embodiments of the invention, it is possible, since an eNB is used as a sink for the local sensor network, to solve contradictions in functionalities of a UE and a sink in general. Furthermore, the UE may play a role of an information collector. Since a eNB may have access to a plurality of UEs and may have such several potential information collectors on hand, the quantity of collectable information may be hugely increased which enhances network transmission efficiency and may also serve to prolong sensor network lifetime. By means of examples of embodiments of the invention, the fact that a position of UEs is usually not fixed and may change, sensor network's topology is set such that the collecting efficiency using an UE which may appear in different position is improved. Furthermore, since in certain situations a single UE as gateway may not be able to collect sufficient information of sensor nodes of the whole local sensor network, measures are taken to enable to use more than one UE as gateways for one sink so as to enhance the efficiency of data collection further.

According to examples of embodiments, a beacon cluster based sensor network information collection mechanism is proposed. In this mechanism, it is assumed that the topology of a beacon cluster based sensor network, as shown in FIG. 1, for example, is semi-static, i.e., that a sensor node is able to switch the link between different other sensor nodes so as to be able to form a route towards respective different cluster heads. By means of this semi-static type of topology, a topology formation process can be accelerated which allows that a gateway appears at a random location and has still access to data of a plurality or all sensor nodes of the WSN.

Next, examples of embodiments of the invention concerning a procedure for configuring and establishing a connection between a local sensor network and a communication network control element like an eNB acting as a sink by using a communication network element like a UE acting as a gateway element for collecting information from the local sensor network will be described.

Generally, according to examples of embodiments, once a communication network element like a UE decides that it is willing to collect WSN information and thus to access a WSN beacon cluster head, it senses which cluster head nodes can be reached. For example, regular signaling sent by a cluster head, such as a beacon transmission from a beacon cluster head in the WSN, is tried to receive.

If a cluster head is within reach and a signaling, like a beacon signal, is received, specific measurements are conducted by the UE. For example, based on the received signal, the UE collects synchronization information, signal strength information and local beacon cluster information, such as an ID, properties or capabilities of the cluster head, remaining energy available for transmission, or the like.

Based on the received and measured information, the UE sends a report of measurement results and an accessing request to the communication network control element, such as the eNB, which may act as the sink for the WSN information to be collected. The communication network control element executes a selection processing in order to decide whether the UE sending the report and accessing request is suitable/optimal as acting as a gateway element. For example, a determination of whether or not the UE is a suitable gateway may be based on a reported signaling quality between the UE and the CH, the capability of the UE, the connection between eNB and the UE (available band width, quality of service, restrictions due to subscriber configuration etc.), the capability of the CN (remaining energy, number/type of connected sensor nodes etc), and the like. It is to be noted that the actual criteria on which the decision to select a UE as a gateway may be different for each application, wherein more than one criteria is applicable with differing weighting factors.

It is to be noted that in the decision of whether or not a UE is to be selected as a gateway it may also be considered if other UEs have sent a report and accessing request to the same WSN, wherein in such a case one or more of the UEs in question may be selected as gateways, if suitable.

When the decision about the selection as a gateway element is completed, the eNB informs the selected UE(s) about the decision that it is allocated as a gateway element. It is to be noted that a UE which is not selected as a gateway may also be informed about this decision, possibly with a reason why it is not allocated. The eNB sends to the selected UE a broadcasting sequence of UE.

When a UE is selected as a gateway, it may perform an awakening processing for the sensor nodes of the local sensor network (which may be preferably in an idle mode, as indicated above), e.g. by triggering the cluster head to awake WSN nodes or by awaking the sensor nodes by itself.

When the sensor nodes are awaken and can thus receive information, the UE transmits information to the sensor nodes including a topology update notification. This notification informs the sensor nodes about the cluster head with which the UE is communicating. The transmission can be done, for example, by means of a broadcast signaling from the UE or by forwarding the information via the cluster head (e.g. when the connections between the sensor nodes and the cluster head are bidirectional).

When receiving the topology update notification, the sensor nodes may change a network flow direction for forwarding their measurement results in the sensor network. For example, each sensor node may be provided with a pre-defined routing table from which a flow direction is derivable on the basis of the indicated beacon cluster or cluster head to be used (i.e. accessed by the UE), and can change the network flow direction correspondingly. By means of this, it is ensured that the whole WSN information can be collected by the mobile gateway in efficient way via a corresponding cluster head node.

Figure 2:
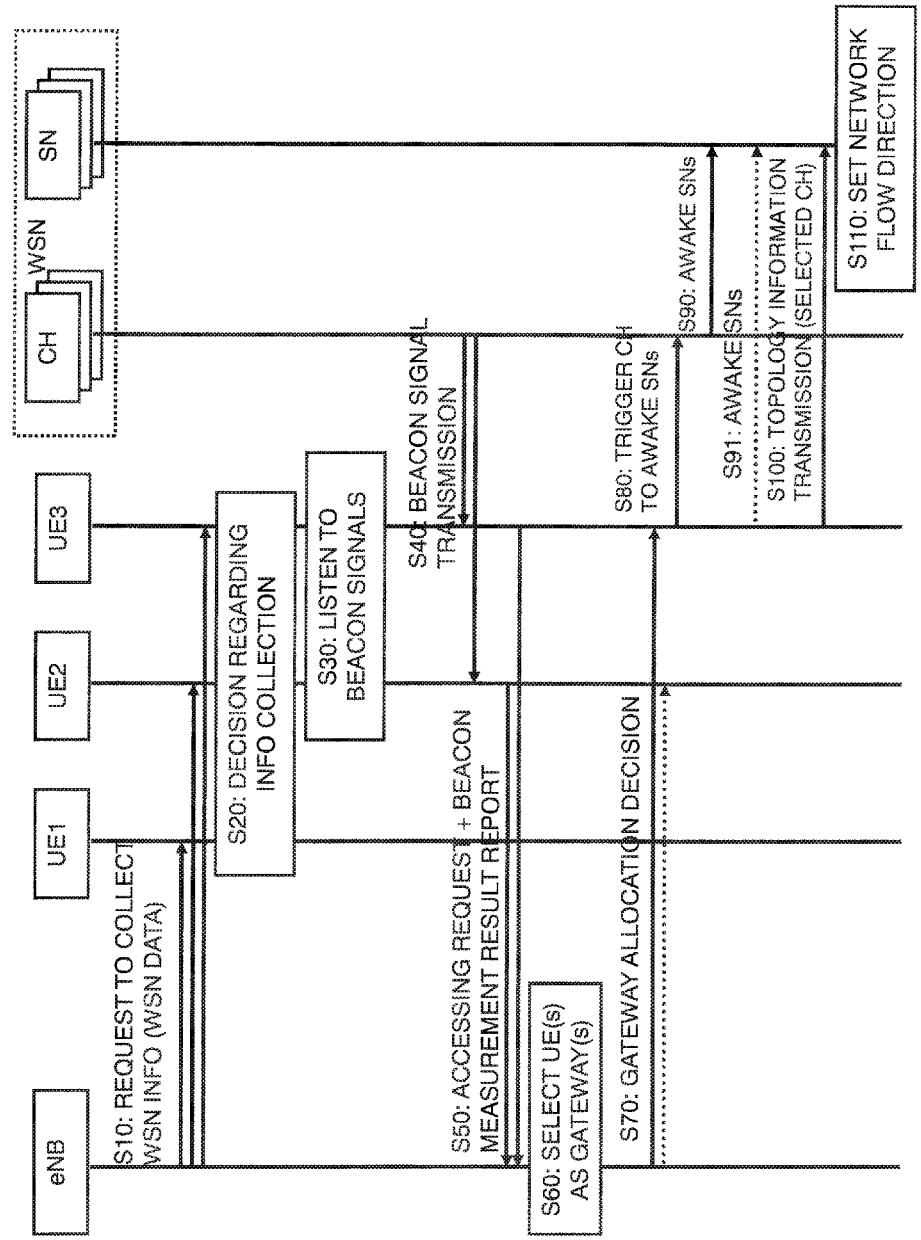
FIG. 2 shows a diagram illustrating a procedure for establishing a connection using a gateway element for collecting information from a WSN according to examples of embodiments of the invention.

With regard to FIG. 2, an example of an embodiment of the invention is described for explaining the initialization and configuration of beacon cluster based sensor network information collection mechanism.

In the example shown in FIG. 2, it is assumed that an eNB (e.g. eNB 50 of FIG. 1) wishes to collect WSN information (sensor data etc.) from the WSN. Therefore, it sends a request message to UEs being reachable and asks them whether they will become information collectors, i.e. whether they are willing to serve as mobile gateway.

In this connection, it is to be noted that also a UE may decide that it wishes to collect corresponding WSN information and contacts thus other UEs to become information collectors, or act as an information collector by itself.

In the example of FIG. 2 it is assumed that there are three UEs within reach of the requesting eNB.

Specifically, when referring to FIG. 2, the eNB sends in step S10 a request message to the available UEs, namely, UE1, UE2, UE3 in which they are requested to become information collectors for the WSN information. With this request message, also information concerning the WSN from which information is to be collected is included, in order to enable the UEs to determine which WSN is meant.

In step S20, the UEs UE1, UE2 and UE3 decide whether they are capable to be a gateway element and if are willing to become an information collector for the eNB. This decision may be based, for example, on a current work-load of the UE, subscriber settings or the like.

In the example of FIG. 2, only UE2 and UE3 decide that they may become information collectors. UE1 decides to be not an information collector and ends thus the processing.

In step S30, UE2 and UE3 listen whether they receive a signaling, such as a beacon signal, from a cluster head node of the WSN in question. In step S40, the UEs UE2 and UE3 receive a beacon signal transmission from at least one of the cluster heads, e.g. CH 25 of FIG. 1.

Then, in step S50, after having created a report on measurements based on the received beacon signal from the cluster head, UE2 and UE3 sends an accessing request including the report on the measurement results to the eNB, including an identification of the cluster head node whose signaling forms the basis of the measurement.

The eNB processes the received accessing requests and measurement results in order to decide whether and which one of the UEs sending the accessing request is suitable for becoming a gateway element. As indicated above, more than one UE may be selected as a gateway.

In the example of FIG. 2, the eNB decides that only UE3 is suitable for becoming a gateway node. Therefore, it sends in step S70 a message to UE3 informing it about the gateway allocation decision taken in the processing in step S60.

As indicated by a dashed arrow in connection with step S70, the eNB may also inform the not-selected UE2 about the decision, whereupon UE2 may terminate the processing.

When the UE3 has received the decision that it is accepted as the gateway element, the UE3 starts an awakening procedure for the sensor nodes of the WSN. As indicated in step S80, as one option, the UE3 sends a trigger message to the cluster head node in order to instruct it to awake the sensor nodes. If this is the case, the cluster head sends in step S90 a signal to the sensor nodes to end the idle mode and to become operational. Alternatively, the UE3 may send a signal to the sensor nodes directly in order to awake them (indicated by the dashed arrow at step S91).

When it is ensured that the sensor nodes are operational, i.e. have ended the idle mode (e.g. after a predetermined time has elapsed or after receiving a ready signaling from the WSN, or the like), the UE3 being selected as the gateway element transmits in step S100 topology information to the sensor nodes. The topology information informs the sensor nodes about the CH selection, i.e. about the identity of the cluster head with which the UE3 communicates. The topology information may be broadcasted by the UE3 or alternatively forwarded via the CH to which the UE3 has access.

In step S110, when the sensor nodes receives the topology information, they automatically change a network flow direction for example according to pre-defined routing table information (to be described later) and initiate the data traffic (i.e. send own sensor detection results or forward sensor detection results of other sensor nodes whose traffic flow towards the cluster head is directed via this sensor node).

In the signaling related to the initialization and configuration of beacon cluster based sensor network information collection mechanism, there are four types of signaling used in the transmission process, which are shown in the following Table 1.

TABLE 1 signaling messages in beacon-based information collection process

| Signaling | Link | Information | Usage |
| --- | --- | --- | --- |
| REQUEST (see S50) | Uplink-cellular | Cluster ID | Willingness to access WSN for information collection |
| GATEWAY-ALLOCATION (see S70) | Downlink-cellular | Notification | eNB choose one or more UEs to become gateway |
| AWAKEN (see S80, S90, S91) | WSN | Notification | Notify the sensor nodes to wake up for transmission |
| TOPOLOGY-BROADCAST (see S100) | WSN | Cluster ID | Inform each sensor node to change flow direction |

The "Link" column in table 1 refers to the communication paths used for forwarding the respective signaling to the destination nodes.

In case of the REQUEST signaling, uplink communication paths in a cellular (e.g. LTE based) network are used from the UE to the eNB.

In case of the GATEWAY ALLOCATION signaling, corresponding downlink communication paths in the cellular (e.g. LTE based) network are used from the eNB to the UE. In case of the AWAKEN signaling, as indicated in FIG. 2, a communication path from the UE to the cluster head node may be used (for example radio based or the like, depending on the interface provided between UE and cluster head node) for triggering the cluster head node to wake up the sensor nodes by using the (normal) communication paths/interfaces provided in the local sensor network between the nodes, or a suitable communication path between the UE and all sensor nodes of the local sensor network (e.g. also radio based or the like) may be used in case the UE wakes up the sensor nodes by itself.

In case of the TOPOLOGY BROADCAST signaling, similar to the AWAKEN signaling, as indicated in FIG. 2, a suitable communication path between the UE and all sensor nodes of the local sensor network (e.g. radio based broadcasting signaling or the like) may be used. Alternatively, a communication path from the UE to the cluster head node may be used (for example radio based or the like, depending on the interface provided between UE and cluster head node) for triggering the cluster head node to forward the topology information to the sensor nodes by using the (normal) communication paths/interfaces provided in the local sensor network between the nodes.

As indicated above, the sensor nodes may be provided with information about how a network flow is to be set in case of different cluster heads used by the gateway. For example, all WSN nodes (including a cluster head which may also function as a sensor node) are provided with a pre-defined routing table with different network flow directions for different destination cluster heads.

In the following Table 2, an example of a routing table for a specific node indicated as node "n0" with regard to neighboring nodes indicated as node "n1", "n2" and "n3" (shown in FIGS. 3A to 3C described below) is provided. It is to be noted that this table represents only one possible example. The traffic flow direction decision fields may include more than one target node, and the target nodes for each of the nodes of the WSN may be different to each other.

In any case, on the basis of the individual routing table, each node of the WSN is able to find, on the basis of the information provided in the topology information regarding the ID of the beacon cluster or cluster head accessed by the mobile gateway, a next target or hop of the traffic flow direction for the sensor data and the like.

TABLE 2

Routing Table according to the combination of Beacon Cluster for node n0

| Optional Beacon Cluster ID Notification | Traffic Flow Direction Decision |
| --- | --- |
| ① BC-I | n1 |
| ② BC-I, BC-II | n1 |
| ③ BC-I, BC-III | n1 |
| ④ BC-I, BC-II, BC-III | n1 |
| ⑤ BC-II | n2 |
| ⑥ BC-II, BC-III | n2 |
| ⑦ BC-III | n3 |

The effect of the routing tables in the initialization and configuration of beacon cluster based sensor network information collection mechanism as described in connection with FIG. 2 in a local sensor network like a WSN as shown in FIG. 1 is explained in connection with FIGS. 3A to 3C.

Figures 3A, 3B, 3C:
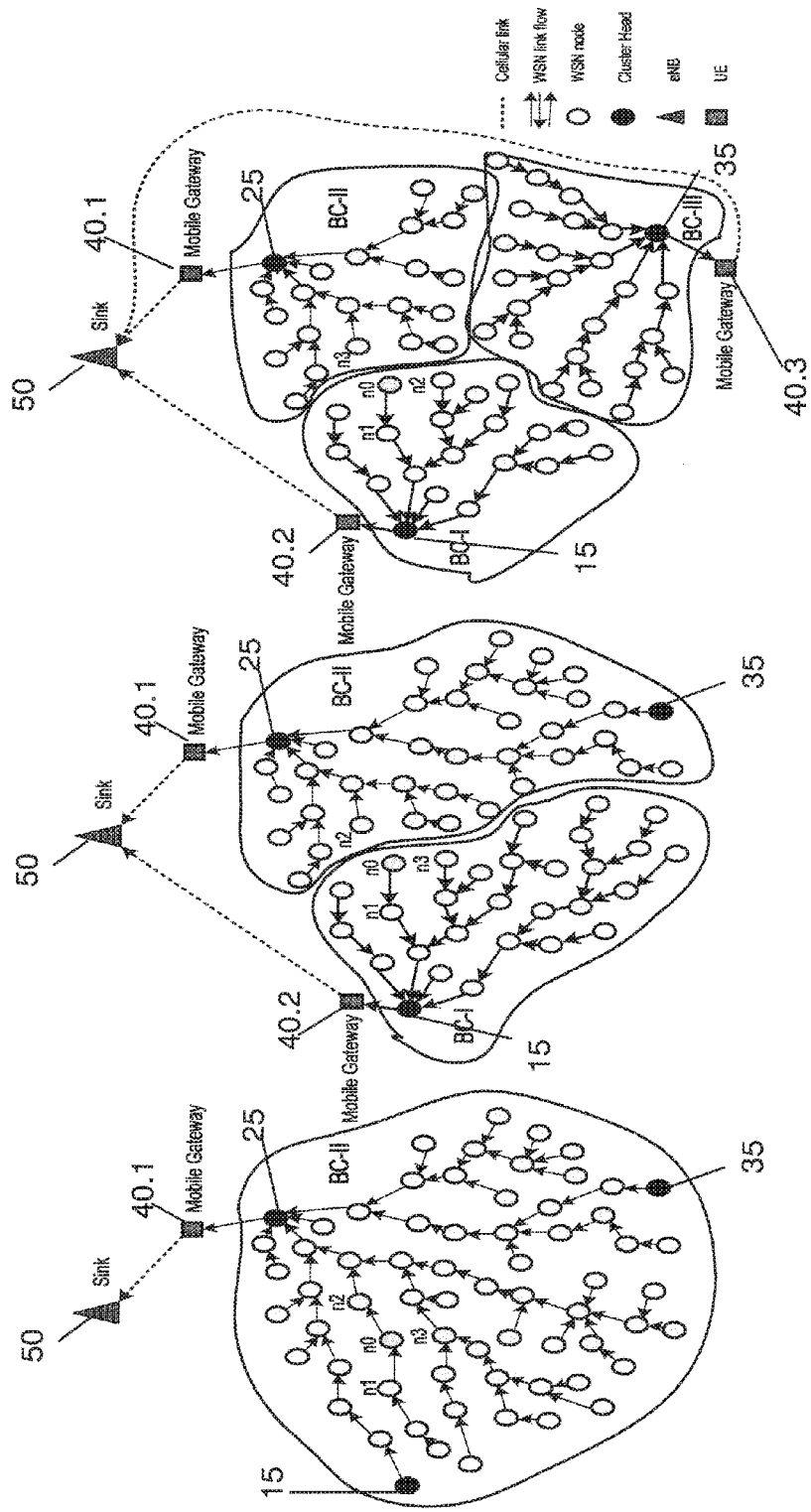
FIGS. 3A to 3C show examples of route establishments in a wireless sensor network according to examples of embodiments of the invention.

FIGS. 3A to 3C show different scenarios with a different number of gateways and resulting different traffic flows in the WSN.

Specifically, in FIG. 3A, a scenario is shown where only one mobile gateway (designated with reference sign 40.1) is available or selected by the eNB 50. The mobile gateway 40.1 accesses the WSN at the cluster head node 25 which belongs to group_2 of the clusters of the WSN as shown in FIG. 1 and is thus referred to as BC-II. Therefore, when the gateway element 40.1 obtains the permission to collect local network information from the sink 50, the gateway node sends (e.g. broadcasts) the awaken signal in order to awaken the sleeping sensor nodes. The awakened sensor nodes keep listening for the following broadcasting message about beacon cluster (cluster head 25) ID from gateway, which is BC-II in the present example. When looking at node n0, of which the routing table is table 2, when receiving the notification about BC-II and checking its local routing table, case ⑤ is valid which means that node n0 choose node n2 to be its destination for its flow direction, i.e. the next destination node for the data traffic flow towards the cluster head node identified in the topology information. The other nodes direct their flows to corresponding other nodes, as indicated in FIG. 3A, including the cluster heads 15 and 35 being not accessed by a gateway element.

In FIG. 3B, the situation is such that two gateways 40.1 and 40.2 are selected by the sink 50, wherein gateway 40.1 accesses again cluster head 25 (i.e. beacon cluster ID is BC-II), while gateway 40.2 accesses cluster head 15 (i.e. beacon cluster ID is BC-I). Referring to the routing table of node n0 (see Table 2), when receiving ID notification about BC-I and BC-II from the two gateways, after checking the routing table, case ② is valid. Therefore, node n0 change its traffic flow direction to node n1. The other nodes direct their flows to corresponding different nodes, as indicated in FIG. 3B, including the cluster head 35 being not accessed by a gateway element.

In FIG. 3C, the situation is such that three gateways 40.1, 40.2 and 40.3 are selected by the sink 50, wherein gateway 40.1 accesses cluster head 25 (i.e. beacon cluster ID is BC-II), gateway 40.2 accesses cluster head 15 (i.e. beacon cluster ID is BC-I), and gateway 40.2 accesses cluster head 35 (i.e. beacon cluster ID is BC-III). Referring to the routing table of node n0 (see Table 2), when receiving ID notification about BC-I, BC-II and BC-III from the three gateways, after checking the routing table, case ④ is valid. Therefore, node n0 change its traffic flow direction to node n1. The other nodes direct their flows to corresponding different nodes, as indicated in FIG. 3C.

As indicated above, the cluster head nodes 15, 25, 35 may also be acting a sensor node in the local sensor network, in addition to the functions required by acting as the cluster heads. That is, as indicated e.g. in FIGS. 3A and 3B, in case the mobile gateway (the UE) is located such that a node (e.g. node 15 in FIG. 3A) being a potential cluster head is not acting as such, this node may become a normal sensor node. In this case, a routing table may be provided which directs a traffic flow towards another cluster head node (in FIG. 3A, node 25), wherein the topology information may be received in the same manner as in case of the usual sensor nodes.

Figure 4:
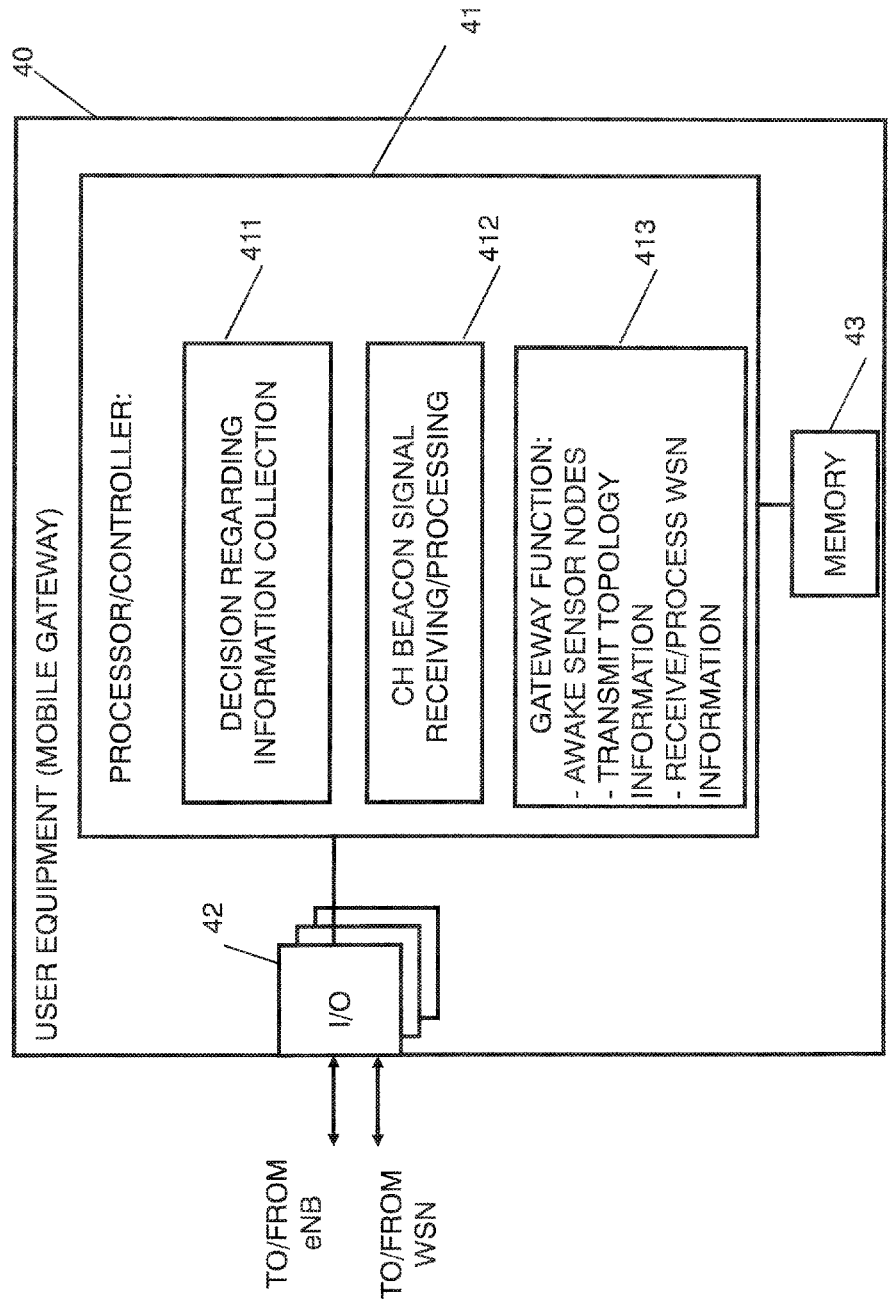
FIG. 4 shows a block circuit diagram illustrating a configuration of a communication network element usable as a gateway according to examples of embodiments of the invention.

In FIG. 4, a block circuit diagram illustrating a configuration of a communication network element, such as a UE 40, being usable as a gateway according to examples of embodiments of the invention is shown, which is configured to implement the processing as described in connection with FIG. 2, for example. It is to be noted that the communication network device or UE 40 shown in FIG. 4 may comprise several further elements or functions besides those described herein below, which are omitted herein for the sake of simplicity as they are not essential for understanding the invention.

The UE 40 may comprise a processing function or processor 41, such as a CPU or the like, which executes instructions given by programs or the like related to the power control. The processor 41 may comprise further portions dedicated to specific processings as described below. Portions for executing such specific processings may be also provided as discrete elements or within one or more further processors, for example. Reference signs 42 denote transceiver or input/output (I/O) units connected to the processor 41. The I/O units 42 may be used for communicating with other network elements, such as the eNB 50, or local sensor network elements, such as the cluster heads. The I/O units 42 may be a combined unit comprising communication equipment towards several of the network elements in question, or may comprise a distributed structure with a plurality of different interfaces for each network elements in question. Reference sign 43 denotes a memory usable, for example, for storing data and programs to be executed by the processor 41 and/or as a working storage of the processor 41.

The processor 41 is configured to execute processings related to the above described sensor network information collection mechanism. In particular, the processor 41 comprises a sub-portion 411 which is usable as a decision portion for deciding of whether or not the UE 40 participates in the information collection. The portion 411 may be configured to perform processings according to step S20 of FIG. 2, for example. Furthermore, the processor 41 comprises a sub-portion 412 which is usable as a receiving and processing portion for the signaling of the cluster heads (e.g. the beacon signal), wherein the processing may also include the determination of measurement results to be transmitted to the eNB in the accessing request (according to steps S30, S40 and S50 of FIG. 2). Moreover, the processor 41 comprises a sub-portion 413 which is usable as a gateway function processing portion, which comprises the awakening processing for the sensor nodes, the transmitting processing of the topology information, and a receiving and processing of sensor data with the data flow from the cluster head.

Figure 5:
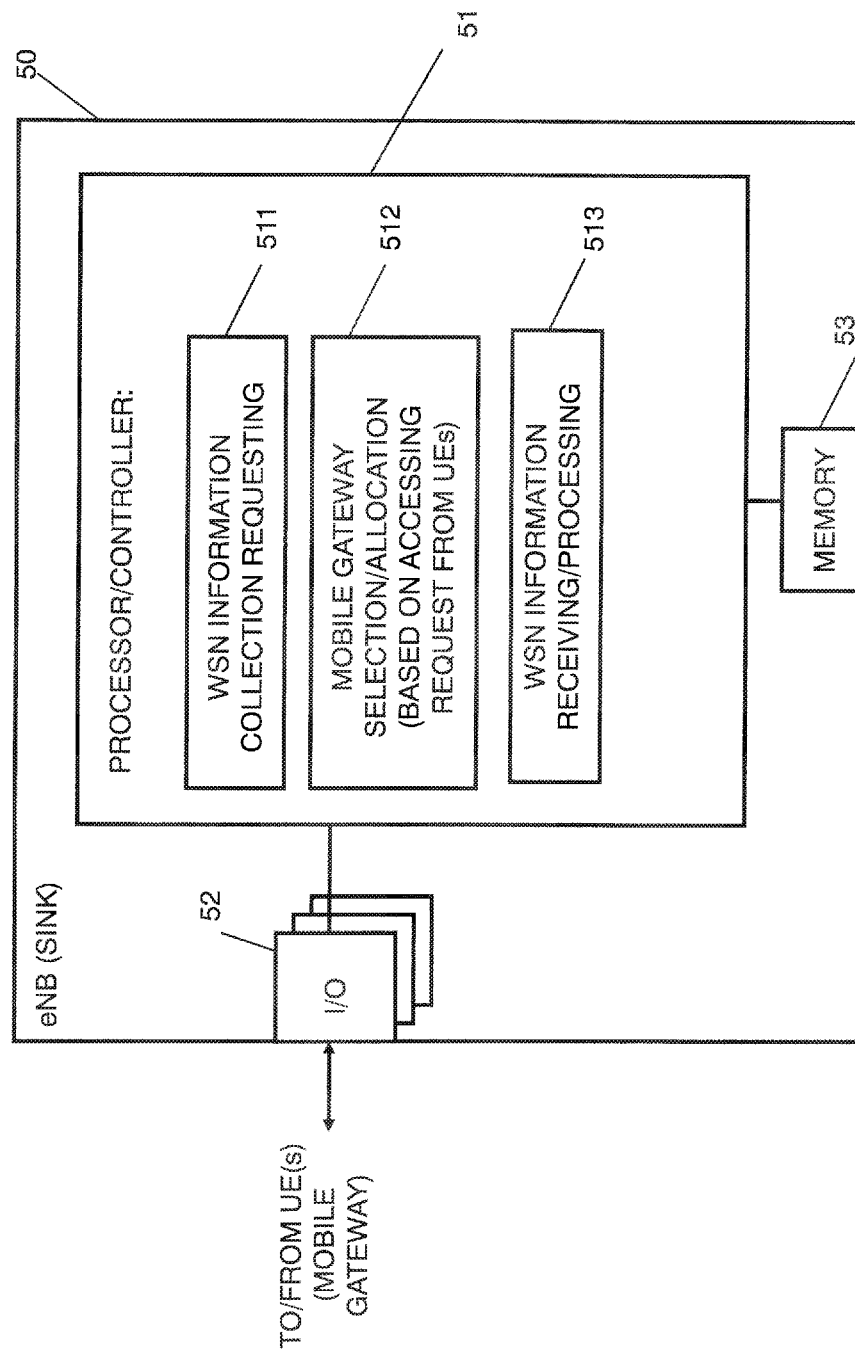
FIG. 5 shows a block circuit diagram illustrating a configuration of a communication network control element usable as a sink according to examples of embodiments of the invention.

In FIG. 5, a block circuit diagram illustrating a configuration of a communication network control element, such as the eNB 50, which is usable as a sink for the local sensor network, according to examples of embodiments of the invention is shown, which is configured to implement the processings as described in connection with FIG. 2, for example. It is to be noted that the communication network control element or eNB 50 shown in FIG. 5 may comprise several further elements or functions besides those described herein below, which are omitted herein for the sake of simplicity as they are not essential for understanding embodiments.

The eNB 50 may comprise a processing function or processor 51, such as a CPU or the like, which executes instructions given by programs or the like related to the power control. The processor 51 may comprise further portions dedicated to specific processings as described below. Portions for executing such specific processings may be also provided as discrete elements or within one or more further processors, for example. Reference signs 52 denote transceiver or input/output (I/O) units connected to the processor 51. The I/O units 52 may be used for communicating with other network elements, such as communication network elements or UEs being candidates for becoming a gateway. The I/O units 52 may be a combined unit comprising communication equipment towards several of the network elements in question, or may comprise a distributed structure with a plurality of different interfaces for each network elements in question. Reference sign 53 denotes a memory usable, for example, for storing data and programs to be executed by the processor 51 and/or as a working storage of the processor 51.

The processor 51 is configured to execute processings related to the above described sensor network information collection mechanism. In particular, the processor 51 may comprise a sub-portion 511 which is usable as a requesting portion for requesting available communication network elements such as UEs to become an information collector (i.e. mobile gateway) from the local sensor network. The portion 511 may be configured to perform processings according to step S10 of FIG. 2, for example. Furthermore, the processor 51 may comprise a sub-portion 512 which is usable as selection or decision portion for deciding of whether a UE is suitable to become a gateway, based on information received with an accessing request. The portion 512 may be configured to perform processings according to step S60 of FIG. 2, for example. Moreover, the processor 51 comprises a sub-portion 513 which is usable for receiving and processing sensor data from the WSN via the selected gateway(s), i.e. which performs the functions of the sink of the local sensor network.

Figure 6:
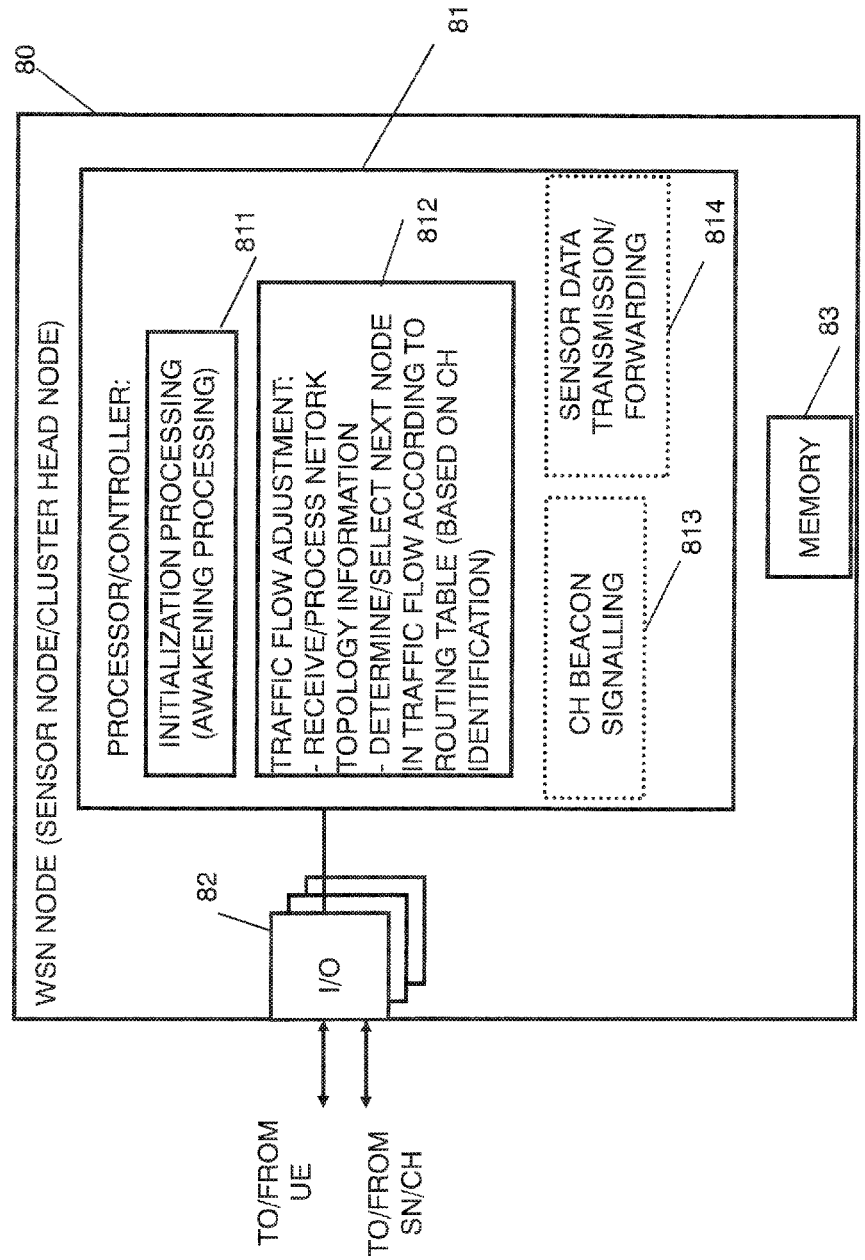
FIG. 6 shows a block circuit diagram illustrating a configuration of a sensor network node usable as a cluster head or sensor node according to examples of embodiments of the invention.

In FIG. 6, a block circuit diagram illustrating a configuration of a WSN node of the local sensor network, such as a cluster head node or a sensor node as indicated in FIG. 1 is shown, which is configured to implement the processing as described in connection with FIG. 2, for example. It is to be noted that the sensor node or cluster head (WSN) node 80 shown in FIG. 6 may comprise several further elements or functions besides those described herein below, which are omitted herein for the sake of simplicity as they are not essential for understanding embodiments.

The WSN node 80 may comprise a processing function or processor 81, such as a CPU or the like, which executes instructions given by programs or the like related to the power control. The processor 81 may comprise further portions dedicated to specific processings as described below. Portions for executing such specific processings may be also provided as discrete elements or within one or more further processors, for example. Reference signs 82 denote transceiver or input/output (I/O) units connected to the processor 81. The I/O units 82 may be used for communicating with other local sensor network nodes, such as other sensor nodes or a cluster head node, or a mobile gateway such as a UE. The I/O units 82 may be a combined unit comprising communication equipment towards several of the network elements in question, or may comprise a distributed structure with a plurality of different interfaces for each network elements in question. Reference sign 83 denotes a memory usable, for example, for storing data and programs to be executed by the processor 81 and/or as a working storage of the processor 81. The memory 83 may be used, for example, as a storage for routing table information as shown in table 2.

The processor 81 is configured to execute processings related to the above described sensor network information collection mechanism. In particular, the processor 81 comprises a sub-portion 811 which is usable as an initialization processing portion executing processings related to an awakening processing. For example, in case the WSN node is acting as a cluster head node, the sub-portion 811 may be capable of receiving and processing an awaken signal to trigger an wake-up processing for sensor nodes (according to steps S80 and S90, for example). In case the WSN node is a mere sensor node which is in an idle mode unless woken up, the sub-portion 811 may be capable of starting the WSN node (i.e. change the operation mode from idle state to operational state) when an awaken signaling from the UE or the CH is received (according to steps S90 and S91, for example). Furthermore, the processor 81 comprises a sub-portion 812 which is usable for the traffic flow adjustment processing. That is, the sub-portion 812 may be able to receive and process topology information for identifying a beacon cluster head (according to step S100 of FIG. 2), and to refer to information mapping a beacon cluster head information to a next destination node, i.e. to select the next node in a traffic flow direction (i.e. to refer to a routing table as shown in table 2) (according to step S110 of FIG. 2). Moreover, the processor 81 may comprise a sub-portion 813, when acting as a cluster head, which may be able to send a beacon signaling (according to step S40 of FIG. 2), and a sub-portion 814 which is usable to send own sensor data or forward sensor data of other sensor nodes to the cluster head (i.e. to the next destination node), wherein in case the WSN node 80 is the cluster head, the sub-portion 814 may be able to forward all received sensor data to the UE acting as the mobile gateway.

According to a further example of embodiments of the invention, there is provided an apparatus comprising processing means configured to decide on whether an information collecting operation for collecting information from a local sensor network is executed, first receiving means configured to receive a signaling transmitted from a managing node of a local sensor network, and transmitting means configured to transmit to a communication network control element a report message comprising measurement results derived from the signaling received from the managing node of the local sensor network.

In addition, according to a yet further example of embodiments of the invention, there is provided an apparatus comprising receiving means configured to receive from a communication network element an accessing request for requesting allocation as a gateway element for collecting information from a local sensor network, the accessing request comprising a report of measurement results regarding a signaling received by the communication network element from a managing node of the local sensor network, processing means configured to determine whether the communication network element is to be selected as a gateway element, and transmitting means configured to send, in response to the accessing request, a gateway allocation message informing that the communication network element is determined to be a gateway element to the local sensor network.

Moreover, according to a still further example of embodiments of the invention, there is provided an apparatus comprising routing processing means configured to adjust a traffic flow direction in accordance with network topology information transmitted from a communication network element, wherein the network topology information indicates a cluster head node identification identifying at least one network node acting as a cluster head node for a local sensor network, wherein the routing processing means are further configured to determine a next destination node for a data traffic flow in the local sensor network on the basis of the cluster head node identification.

For the purpose of the present invention as described herein above, it should be noted that:

an access technology via which signaling is transferred to and from a network element or local sensor node may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a sensor network information collection mechanism in which, after a UE has decided to become part of an information collecting operation for collecting information from a local sensor network, a signaling transmitted from a managing node of a local sensor network is received and processed. A communication network control element is informed about the willingness to become an information collector by sending a report message comprising measurement results derived from the signaling received from the managing node of the local sensor network. When receiving a gateway allocation message indicating that the UE is determined to be a gateway element to the local sensor network, the information collecting operation is started wherein sensor nodes of the local sensor network are woke up, and a traffic flow direction in the local sensor network is set in accordance with the managing node identity to which the UE is accessed.

Although the present invention has been described herein before with reference to particular embodiments thereof, the present invention is not limited thereto and various modifications can be made thereto.

What is claimed is:

1. An apparatus, comprising;
a memory including processor-readable instructions;
an input/output unit configured for communication within a sensor network; and a processor configured to execute the processor-readable instructions to:
receive a wakeup message via the input/output unit;
cause an awakening from an idle mode;
receive an identification of a first sensor node in the sensor network that is a first allocated duster head node, the allocated cluster head node being one of a set of at least one cluster head node in the sensor network;

receive an identification of a second sensor node in the sensor network that is a second allocated cluster head node;

determine a selected neighbor node according to the first allocated cluster head node and the second allocated cluster head node; and route traffic flow to the determined neighbor node.

2. The apparatus of claim 1, the processor further configured to execute the processor-readable instructions to recognize the identification of the first sensor node as an allocation of the apparatus as a cluster head node.

3. The apparatus of claim 2, the processor further configured to execute the processor-readable instructions to transmit a waken message via the input/output unit to the sensor network.

4. The apparatus of claim 2, the processor further configured to execute the processor-readable instructions to transmit the identification of the first and the second cluster head nodes via the input/output unit to the sensor network.

5. The apparatus of claim 2, the processor further configured to execute the processor-readable instructions to receive sensor data information from at least one node in the sensor network via the input/output unit.

6. The apparatus of claim 2, wherein the input/output unit is further configured for communication within a communication network, and wherein the processor is further configured to execute the processor-readable instructions to establish communication with a mobile device in the communication network via the input/output unit, and to transmit to the mobile device information related to data received from the sensor network.

7. A sensor node comprising circuitry configured to:
receive via an input/output unit an identification of a first beacon cluster as being in communication with a gateway;

determine via a processor a first predefined neighbor node according to the first identified beacon cluster;

route traffic flow to the first neighbor node via the input/output unit;

receive an identification of a second beacon cluster as being in communication with a second gateway;

determine via the processor a predefined second neighbor node for the sensor node according to the identified first beacon cluster and second beacon cluster; and route the traffic flow to the second neighbor node via the input/output unit.

8. The sensor node of claim 7, the circuitry further configured to provide the identifications of the first and the second beacon clusters to other nodes in a sensor network via the input/output unit.

9. The sensor node of claim 7, wherein the identifications of the first and the second beacon clusters are part of an identification of a plurality of beacon clusters, and the predefined first and second neighbor nodes are determined from a lookup table according to the identified plurality of beacon clusters.

10. The sensor node of claim 7, wherein the sensor node is allocated as a cluster head node by the identification of the first beacon cluster.

11. The sensor node of claim 7, subsequent to receiving the identification of the second beacon cluster, the circuitry is further configured to provide a wakeup message to other nodes of a sensor network, the other nodes including the first and the second neighbor nodes.

12. The sensor node of claim 7, wherein the first neighbor node is not the second neighbor node.

13. The sensor node of claim 7, the circuitry further configured to adjust traffic flow according to a change of gateway by determining the second predefined neighbor node from a lookup table.

14. The sensor node of claim 7, the circuitry further configured to provide sensor data to the first and the second neighbor nodes.

15. A method, comprising:
receiving at a sensor node first beacon cluster information identifying a first beacon cluster in communication with a first gateway;

determining from the first beacon cluster information a first neighbor node of predefined neighbor nodes assigned according to groupings of the at least one beacon cluster;

routing traffic flow to the first neighbor node;

receiving at the sensor node a second beacon cluster information identifying a second beacon cluster in communication with a second gateway; and determining a second predefined neighbor node according to the first beacon cluster information and the second beacon cluster information.

16. The method of claim 15, wherein each of the beacon cluster information includes an allocation of a cluster head node.

17. The method of claim 15, further comprising ending the routing of traffic flow to the first neighbor node and routing the traffic flow to the second neighbor node.

18. The method of claim 15, further comprising adjusting traffic flow according to a change of gateway by determining a next predefined neighbor node from a lookup table.

19. The method of claim 15, further comprising providing sensor data to the first neighbor node and the second neighbor node.

* * * * *